T. C. FREDERIKSEN.
HAND TRUCK.
APPLICATION FILED JUNE 19, 1909.

953,523.

Patented Mar. 29, 1910.

WITNESSES

INVENTOR
Thorvald C. Frederiksen
BY
ATTORNEYS

UNITED STATES PATENT OFFICE.

THORVALD CARL FREDERIKSEN, OF ASTORIA, OREGON.

HAND-TRUCK.

953,523.      Specification of Letters Patent.      Patented Mar. 29, 1910.

Application filed June 19, 1909. Serial No. 503,103.

*To all whom it may concern:*

Be it known that I, THORVALD CARL FREDERIKSEN, a citizen of the United States, and a resident of Astoria, in the county of Clatsop and State of Oregon, have invented a new and Improved Hand-Truck, of which the following is a full, clear, and exact description.

Among the principal objects which the present invention has in view are: to provide a braking device for hand trucks which will automatically operate on downwardly inclined surfaces; to provide automatic braking devices for hand trucks which are graduated in their operation in conformity with the position of the body of the truck relative to the ground; and to simplify and economize the construction of the truck.

One embodiment of the present invention is disclosed in the structure illustrated in the accompanying drawings, in which similar characters of reference denote corresponding parts in all the views, and in which—

Figure 1:
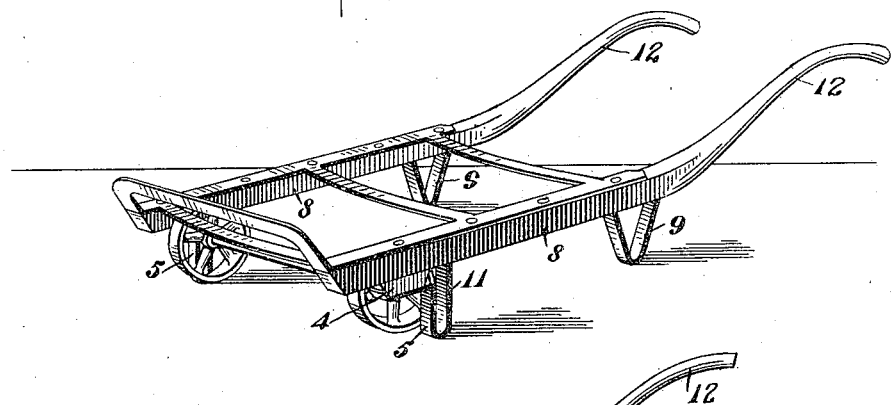
Figure 2:
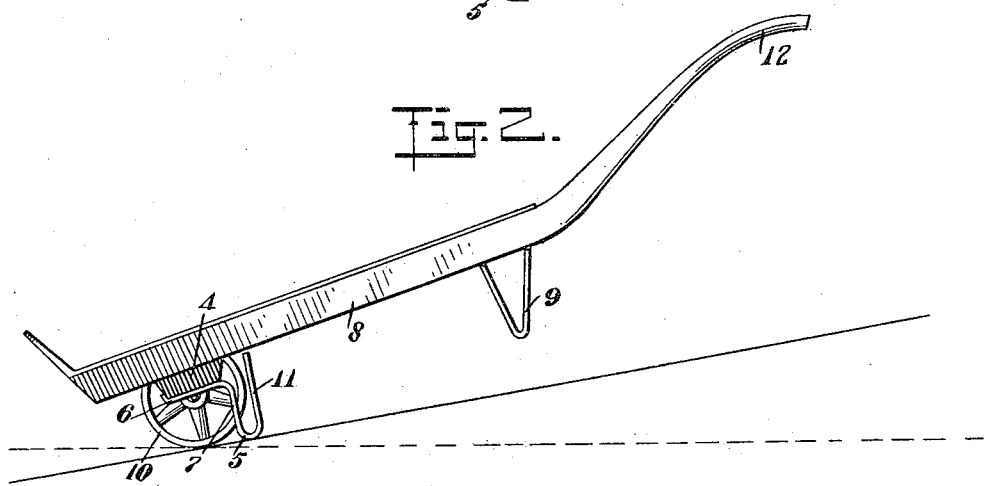
Figure 3:
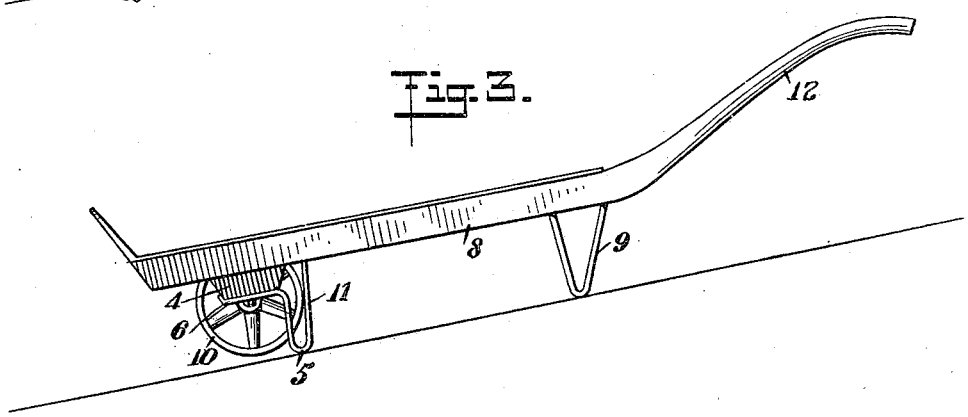

Figure 1 is a perspective view of a hand truck provided with braking attachments constructed in accordance with this invention; Fig. 2 is a side elevation of the same showing the truck in operative position upon a downwardly inclined surface; and Fig. 3 is a side elevation of the truck showing the same in full operative position.

The present invention may be attached to any truck of suitable construction. When attached to the form of truck such as illustrated in the drawings, the bearings of the axle are formed in the under side of the bearing block 4. The braking attachments, of which there are two in number, are secured to the under side of the bearing block. These attachments consist in bended spring members 5—5, provided with horizontal extensions 6—6 which are adapted to extend under the block 4 and to be secured thereto. To the rear of the block the members 5—5 are bent to form downward extensions 7—7. The length of the downward extensions 7—7 is such that when the rails 8—8 of the truck are resting upon the legs 9—9 the wheels 10—10 are raised from the ground by means of the members 5—5, so that the weight of the truck in this position rests upon the legs 9—9 and the members 5—5. In this position of the truck, such as is illustrated in Fig. 3 of the drawings, the extensions 11—11 rest against the under side of the rails 8—8, forming thereby a rigid leg-like structure of the members 5—5. Normally the extensions 11—11 are held away from the rails 8—8, as shown in Fig. 2 of the drawings.

The members 5—5 may be constructed from any suitable material, that preferred by me being the ordinary spring steel.

In a hand truck provided with brake members such as are herein shown and described the operation is as follows: Whenever in the course of operation due to the downward inclination of the ground the forward impulse of the truck is greater than desired by the operator, the handles 12—12 are depressed by the operator until the members 5—5 strike upon and form a brake on the ground. Should the inclination become steeper and more braking influence be required, a greater pressure is applied upon the handles 12—12 until in the position such as shown in Fig. 3 of the drawings, the full weight of the truck and the load carried thereby is received upon the members 5—5.

Having thus described my invention, what I claim as new and desire to secure by Letters Patent is:

1. A hand truck, comprising a carrying body mounted upon a truck wheel, and brake members consisting of bended springs adapted to extend from the body to the ground and in the rear of the said wheel.

2. A hand truck, comprising a carrying body mounted upon truck wheels, and resilient brake members secured upon said body to contact with the ground between the said wheels and the handles of said truck when the handles of said truck are depressed.

3. A hand truck, comprising a carrying body mounted upon truck wheels, and resilient brake members secured upon said body to contact with the ground between the said wheels and the handles of said truck when the handles of said truck are lowered from their normal carrying position, said members having vertical extensions adapted to contact with the body portion to form rigid legs to lift said wheels from the ground when the said handles are sufficiently lowered.

In testimony whereof I have signed my name to this specification in the presence of two subscribing witnesses.

THORVALD CARL FREDERIKSEN.

Witnesses:
GERTRUDE JACKSON,
HENRY SHERMAN.